US009026916B2

(12) United States Patent
Kanjirathinkal et al.

(10) Patent No.: US 9,026,916 B2
(45) Date of Patent: May 5, 2015

(54) USER INTERFACE FOR MANAGING QUESTIONS AND ANSWERS ACROSS MULTIPLE SOCIAL MEDIA DATA SOURCES

(75) Inventors: Rose Catherine Kanjirathinkal, Calicut (IN); Srujana Merugu, Harayana (IN); Amit K. Singh, Ghatkopar (IN); Karthik Visweswariah, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 882 days.

(21) Appl. No.: 13/167,452

(22) Filed: Jun. 23, 2011

(65) Prior Publication Data

US 2012/0331390 A1 Dec. 27, 2012

(51) Int. Cl.
| | |
|---|---|
| *G06F 3/00* | (2006.01) |
| *G06Q 50/00* | (2012.01) |
| *G06Q 10/10* | (2012.01) |
| *G06F 17/21* | (2006.01) |
| *G06F 17/27* | (2006.01) |

(52) U.S. Cl.
CPC ............... *G06Q 50/01* (2013.01); *G06F 17/21* (2013.01); *G06F 17/2785* (2013.01); *G06Q 10/10* (2013.01)

(58) Field of Classification Search
CPC .............................. G06F 17/21; G06F 17/2785
USPC ....................................................... 715/738
See application file for complete search history.

(56) References Cited

U.S. PATENT DOCUMENTS

| 6,028,601 | A  | * | 2/2000  | Machiraju et al. ............. 715/705 |
| 6,369,840 | B1 | * | 4/2002  | Barnett et al. ................. 715/853 |
| 6,615,238 | B1 | * | 9/2003  | Melet et al. .................... 709/203 |
| 2006/0004601 | A1 |   | 1/2006  | Marks |
| 2009/0292680 | A1 |   | 11/2009 | Sabnani |
| 2010/0268716 | A1 |   | 10/2010 | Degaugue et al. |
| 2010/0281399 | A1 | * | 11/2010 | Banker .......................... 715/758 |

* cited by examiner

*Primary Examiner* — Andrey Belousov
(74) *Attorney, Agent, or Firm* — Patents on Demand P.A.; Brian K. Buchheit; Scott M. Garrett

(57) ABSTRACT

A method for managing user-generated questions and answers across multiple social media data sources can begin with the receiving of query parameters, including a user-entered question, via the user interface of a social media Q&A manage. Social media data sources can be queried for knowledge related to the user-entered question. When knowledge related to the user-entered question exists, the existing related knowledge can be organized and presented in the user interface according to a determined answer quality. When knowledge related to the user-entered question does not exist or is deemed unsatisfactory by a user, the user-entered question can be automatically submitted to applicable social media data sources by the social media Q&A manager on behalf of the user. A status of the submitted user-entered question can be monitored. When the status of the submitted user-entered question changes, the method can be re-executed at the querying step.

11 Claims, 5 Drawing Sheets

Ask a Question    315

Question:  How do I know if I'm in
         360  labor?

Data Sources:

370 — ☐ All Applicable    ☐ Wazoo Answers — 365
      ☐ Ask A Doc         ☐ AnswerWiki
      ☐ Health Forum      ☐ Your Space
                  more Submit  375

FIG. 3B

USER INTERFACE FOR MANAGING QUESTIONS AND ANSWERS ACROSS MULTIPLE SOCIAL MEDIA DATA SOURCES

BACKGROUND

The present invention relates to the field of data management.

Social media has become a common vehicle for mass communication and interaction. A fundamental concept of social media is the ability to share "something" en masse. That is, a member is able to share a photo, a thought, a document, or an experience with other members. Thus, social media sites have collected a wealth of knowledge, especially those designed specifically for knowledge sharing, such as a forums or question and answer (Q&A) sites.

BRIEF SUMMARY

One aspect of the present invention can include a method for managing user-generated questions and answers across multiple social media data sources. Such a method can begin with the receiving of query parameters via the user interface of a social media Q&A manage. The query parameters can at least include a user-entered question. Social media data sources can be queried for knowledge related to the user-entered question. A social media data source can maintain data representing a collection of knowledge from its members. This knowledge can be represented as a textual phrase, a textual sentence, a textual paragraph, a hyperlink, a list, an audio file, a video file, and/or an image. When knowledge related to the user-entered question exists in a social media data source, the existing related knowledge can be organized and presented in the user interface according to a determined answer quality. When knowledge related to the user-entered question is non-existent in a social media data source or deemed unsatisfactory by a user, the user-entered question can be automatically submitted to applicable social media data sources by the social media Q&A manager on behalf of the user. A status of the submitted user-entered question can be monitored. The status can include an unanswered status, an answered status, and a new answer status. When the status of the submitted user-entered question changes to the answered status or the new answer status, the method can be re-executed at the querying step.

Another aspect of the present invention can include a system for managing user-generated questions and answers across multiple social media sources. Such a system can include social media data sources and a social media question and answer (Q&A) manager. The social media data sources can be configured to maintain data representing a collection of knowledge from its respective members. The social media Q&A manager configured to organize and present knowledge from the social media data sources for a user-entered question. The social media Q&A manager can operate independent of the social media data sources.

Yet another aspect of the present invention can include a computer program product that includes a computer readable storage medium having embedded computer usable program code. The computer usable program code configured to receive query parameters, comprising at least a user-entered question, via a user interface. The computer usable program code can be configured to query social media data sources for knowledge related to the user-entered question. A social media data source can maintain data representing a collection of knowledge from its members. This knowledge can be represented as a textual phrase, a textual sentence, a textual paragraph, a hyperlink, a list, an audio file, a video file, and/or an image. When knowledge related to the user-entered question exists in a social media data source, the computer usable program code can be configured to organize and present the existing related knowledge in the user interface according to a determined answer quality. When knowledge related to the user-entered question is non-existent in at least one social media data source or deemed unsatisfactory by a user, the computer usable program code can be configured to automatically submit the user-entered question to applicable social media data sources on behalf of the user. Then, the computer usable program code can be configured to monitor a status of the submitted user-entered question. The status can include an unanswered status, an answered status, and a new answer status. When the status of the submitted user-entered question changes to the answered status or the new answer status, the computer usable program code can be configured to re-execute the method starting at the querying step.

BRIEF DESCRIPTION OF THE SEVERAL VIEWS OF THE DRAWINGS

FIG. 3B is an example of the Ask a Question component of the social media Q&A manager user interface.

DETAILED DESCRIPTION

Figure 1:
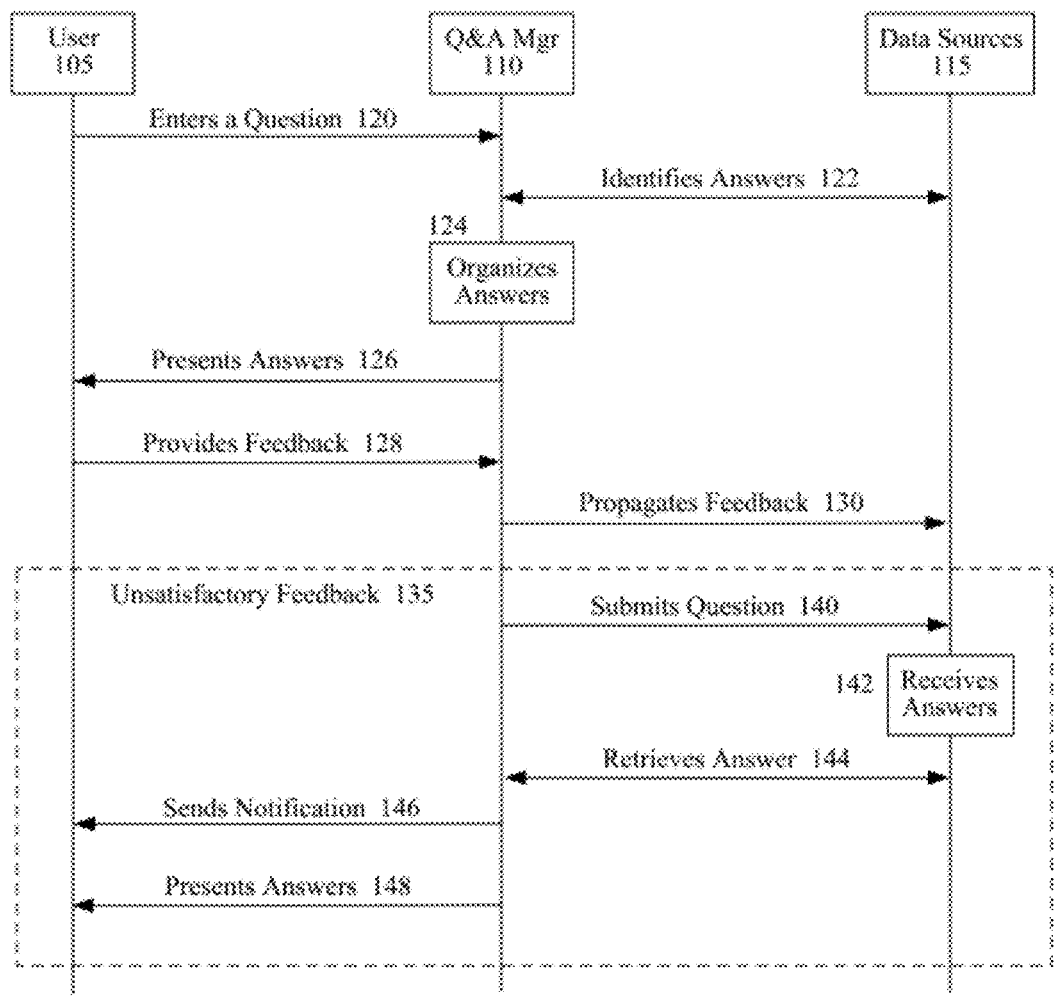
FIG. 1 is an interaction diagram that illustrates the interaction between a user, a social media Q&A manager, and a plurality of social media data sources in accordance with embodiments of the inventive arrangements disclosed herein.

Since social media sites have proliferated astronomically, it is often difficult to find an answer to a question or knowledge about a topic. Further, a question is often reiterated on multiple sites and may have different answers on different sites. Unless a user is a member of each of the sites having an answer to the question or information about the topic, the information is inaccessible. This is also true if the user is an expert providing knowledge; the expert's knowledge is limited to the social media site to which they are a member.

Because of the membership structure of most social media sites, the information is also inaccessible to the search engines. Many users rely upon the results of search engines when looking for information, and are unaware that the information they are searching for is locked away inside a social media site. Further, users may not know which social media sites would be useful to their request so that they could become a member. These problems were recognized and resolved during the course of developing the disclosure.

The disclosure provides a user interface for managing questions and answers across multiple social media data sources. A social media Q&A manager can be configured to accept entry of a user's question, aggregate applicable answers from multiple social media data sources, and present the aggregate in a single user interface. The social media Q&A manager can organize the answers by a calculated answer quality.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is an interaction diagram 100 that illustrates the interaction between a user 105, a social media Q&A manager 110, and a plurality of social media data sources 115 in accordance with embodiments of the inventive arrangements disclosed herein.

Interaction can be initiated when the user 105 enters a question 120 using the social media Q&A manager 110. The social media Q&A manager 110 can represent a software application that can act as a single interaction point for the plurality of social media data sources 115.

A social media data source 115 can represent a variety of computing systems and/or software applications that collect data from a body of members. Examples of social media data sources 115 can include, but are not limited to, social networking sites (e.g., FACEBOOK), communal discussion sites (e.g., bulletin boards, forums), communal gaming sites (e.g., POGO), micro-blogs (e.g., TWITTER), virtual worlds (e.g., SECOND LIFE), communal streaming sites (e.g., USTREAM), data-sharing sites (e.g., YOUTUBE), WIKI sites (e.g., WIKIPEDIA), and a massive multi-player online (MMO) gaming sites (e.g., WORLD OF WARCRAFT), and the like.

The social media Q&A manager 110 can communicate with the social media data sources 115 in order to identify 122 answers to the user's 105 question. Any identified answers can then be organized 124 by the social media Q&A manager 110. The organized answers can be presented to the user 105.

Upon reading the presented answers, the user 105 can feel that their question has been satisfactorily or unsatisfactorily resolved and provide feedback 128 the social media Q&A manager 110 with representative feedback of their satisfaction. The social media Q&A manager 110 can then propagate 130 the feedback to the appropriate social media data sources 115.

In the case where the user 105 provides feedback indicating that their question has be unsatisfactorily answered 135, the interactions contained in the dashed box can be performed. The social media Q&A manager 110 can submit the user's 105 question to one or more of the social media data sources 115 to solicit new and/or better answers.

At a later time, the social media data source 115 can receive 142 an answer to the question from one of its members. The social media Q&A manager 110 can then retrieve 144 the answer from the social media data source 115 and send a notification 146 to the user 105. The next time the user 105 uses the social media Q&A manager 110, the answer can presented 148.

Figure 2:
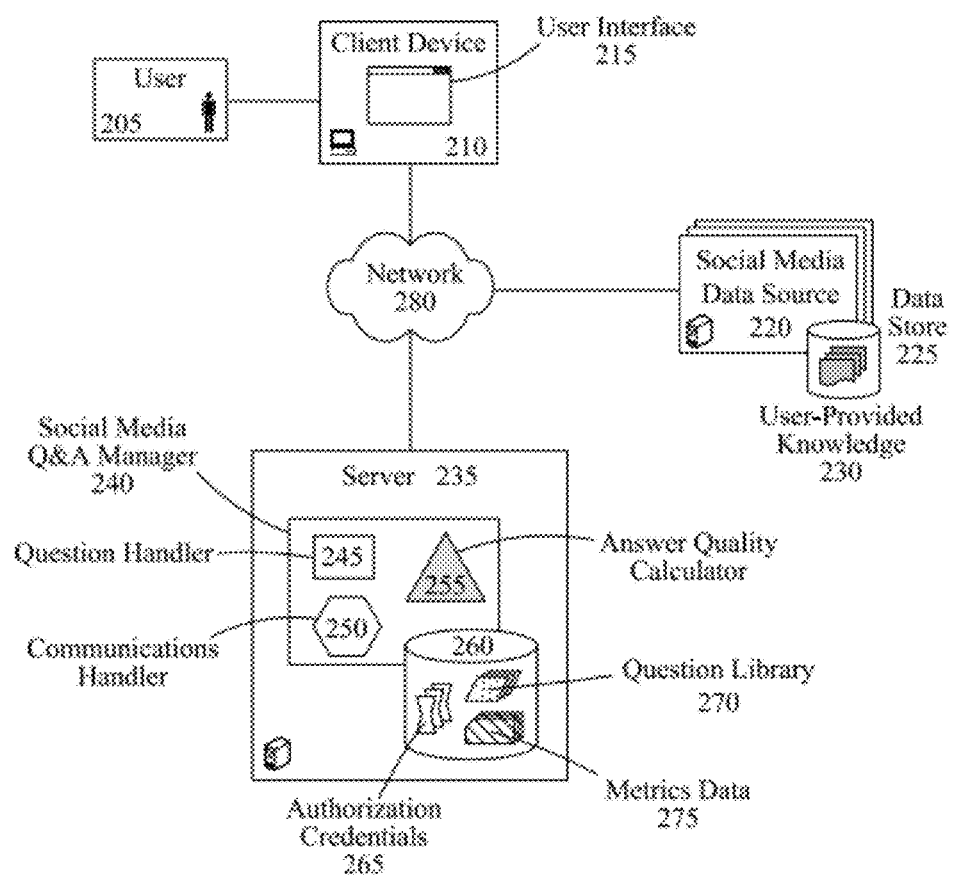
FIG. 2 is a schematic diagram illustrating a system in which a social media Q&A manager can be used in accordance with an embodiment of the inventive arrangements disclosed herein.

FIG. 2 is a schematic diagram illustrating a system 200 in which a social media Q&A manager 240 can be used in accordance with embodiments of the inventive arrangements disclosed herein. System 200 can perform the actions described in interaction diagram 100.

In system 200, the social media Q&A manager 240 can provide a user 205 with answers to a question from multiple social media data sources 220. Access to the social media Q&A manager 240 can be provided using a variety of architectures.

For example, in one contemplated embodiment, the social media Q&A manager 240 can be provided as a paid service. This service can be subscribed to by the user 205 or can be licensed by a social media data source 220 that provides the user 205 with access.

The user 205 can interact with the social media Q&A manager 240 via a user interface 215 running on a client device 210. The client device 210 can represent a variety of computing devices capable of supporting operation of the user interface 215 and communicating with the social media Q&A manager 240 and/or the social media data sources 220 over a network 280.

The user interface 215 can be a graphical means for collecting data from and presenting data to the user 205. The user interface 215 can be written to operate commensurately with the configuration of the client device 210 (i.e., an application written specifically for a smart phone).

As previously discussed, a social media data source 220 can represent a variety of computing systems and/or software applications that collect data from a body of members. The data collected by a social media data source 220 can be referred to as user-provided knowledge 230 and reside in one or more data stores 225 associated with the social media data source 220.

The user-provided knowledge 230 can encompass data of varying formats, depending upon the types of data accepted by the social media data source 220. For example, the user-provided knowledge 230 stored by a micro-blog can comprise only text, whereas a typical blog can include text, images, audio, and/or video formats.

The social media Q&A manager 240 can be a software application that aggregates related user-provided knowledge 230 from multiple social media data sources 220. The social media Q&A manager 240 can operate from a server 235 that is accessible of the network 280. The server 235 can represent the hardware and/or software that supports operation of the social media Q&A manager 240.

The social media Q&A manager 240 can include a question handler 245, a communications handler 250, an answer quality calculator 255, and a data store 260 for storing operational data. The question handler 245 can represent the component of the social media Q&A manager 240 configured to perform functions related to questions entered into the user interface 215 by the user 205.

Examples of functions that can be performed by the question handler 245 can include, but are not limited to, translating the question's text into a query statement, identifying social media data sources 220 that are applicable to the question, querying the social media data sources 220, submitting questions to the social media data sources 220 on behalf of the user 205, monitoring submitted questions for answers, and the like.

The question handler 245 can also be responsible for analyzing queries submitted by the user 205, organizing the queries into a topic or category of the social media data source 220, presenting existing answers to questions related to the user's 205 query, and registering the user's 205 feedback (positive/negative) to the suggested questions and/or answers.

The question handler 245 can be configured to utilize the question library 270 and/or metrics data 275 contained in the data store 260. The question library 270 can represent a historical record of questions received by the social media Q&A manager 240. In addition to the text of the question, the question library 270 can also store the translated query so it can be reused on repeat occasions.

The question library 270 can be further designed to capture other information of value like question frequency for later analysis. For example, question frequency can be used to create a list of "popular" questions that can be presented in the user interface 215 to generate user 205 interest and/or traffic.

The metrics data 275 can represent items of performance data about the social media data sources 220. The question handler 245 can use the metrics data 275 when determining which social media data sources 220 to submit a question.

For example, since monitoring overhead increases with the quantity of social media data sources 220, instead of submitting the question to every social media data source 220, the question handler 245 can look at the metrics data 275 to determine the ten "best" social media data sources 220 that are applicable to the question. Calculation of "best" can be based off of metrics data 275 like average response time, expertise, quantity of members, and the like.

When interacting with the social media data sources 220, the question handler 245 can utilize the communications handler 250. The communications handler 250 can be the component of the social media Q&A manager 240 that establishes and/or manages communication sessions with the social media data sources 220.

The communications handler 250 can utilize the stored authorization credentials 265 when establishing communication sessions. The authorization credentials 265 can represent membership information for a specific social media data source 220. Depending upon implementation of the social media Q&A manager 240, the authorization credentials 265 can contain the username and password set up by the user 205 for the social media data sources 220. Alternately, the question handler 245 can utilize authorization credentials 265 that represent a "guest" member or other type of general membership account.

Answers to the user's 205 question can be organized by an answer quality generated by the answer quality calculator 255. The answer quality can be a quantitative and/or numerical representation of the completeness and/or reliability of the answer. The answer quality calculator 255 can utilize a variety of factors when determining answer quality.

Examples of these factors can include, but are not limited to, the name of the author of the knowledge, a competency level of the author of the knowledge, the amount of time in which the author provided the knowledge, the name of the social media data source containing the knowledge, a position of the knowledge within a data structure of the social media data source (i.e., posting level), a feedback rating assigned to the knowledge by visitors of the social media data source, references associated with the knowledge, and the like.

The social media Q&A manager 240 can then present the ordered answers to the user 205 in the user interface 215. The user 205 can then provide feedback about the answers via the user interface 215, which the social media Q&A manager 240 can convey to the corresponding social media data sources 220.

Network 280 can include any hardware/software/and firmware necessary to convey data encoded within carrier waves. Data can be contained within analog or digital signals and conveyed though data or voice channels. Network 280 can include local components and data pathways necessary for communications to be exchanged among computing device components and between integrated device components and peripheral devices. Network 280 can also include network equipment, such as routers, data lines, hubs, and intermediary servers which together form a data network, such as the Internet. Network 280 can also include circuit-based communication components and mobile communication components, such as telephony switches, modems, cellular communication towers, and the like. Network 280 can include line based and/or wireless communication pathways.

As used herein, presented data stores 225 and 260 can be a physical or virtual storage space configured to store digital information. Data stores 225 and 260 can be physically implemented within any type of hardware including, but not limited to, a magnetic disk, an optical disk, a semiconductor memory, a digitally encoded plastic memory, a holographic memory, or any other recording medium. Data stores 225 and 260 can be a stand-alone storage unit as well as a storage unit formed from a plurality of physical devices. Additionally, information can be stored within data stores 225 and 260 in a variety of manners. For example, information can be stored within a database structure or can be stored within one or more files of a file storage system, where each file may or may not be indexed for information searching purposes. Further, data stores 225 and/or 260 can utilize one or more encryption mechanisms to protect stored information from unauthorized access.

Figure 3:
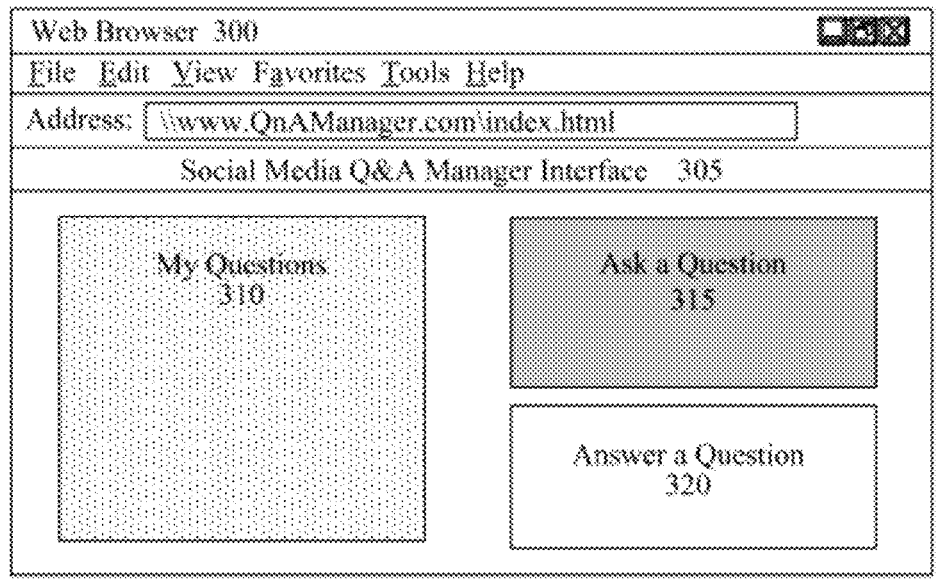
FIG. 3 is an illustration of a Web browser depicting an example user interface for the social media Q&A manager in accordance with an embodiment of the inventive arrangements disclosed herein.

FIG. 3 is an illustration of a Web browser 300 depicting an example user interface 305 for the social media Q&A manager in accordance with embodiments of the inventive arrangements disclosed herein. The social media Q&A manager 305 can be utilized within the context of interaction diagram 100 and/or system 200.

As shown in this example, the social media Q&A manager can be a Web service having a user interface 305 presented to the user within a Web browser 300. The social media Q&A manager user interface 305 can various interaction components, such as the My Questions component 310, Ask a Question component 315, and Answer a Question component 320 shown in this example.

Figure 3A:
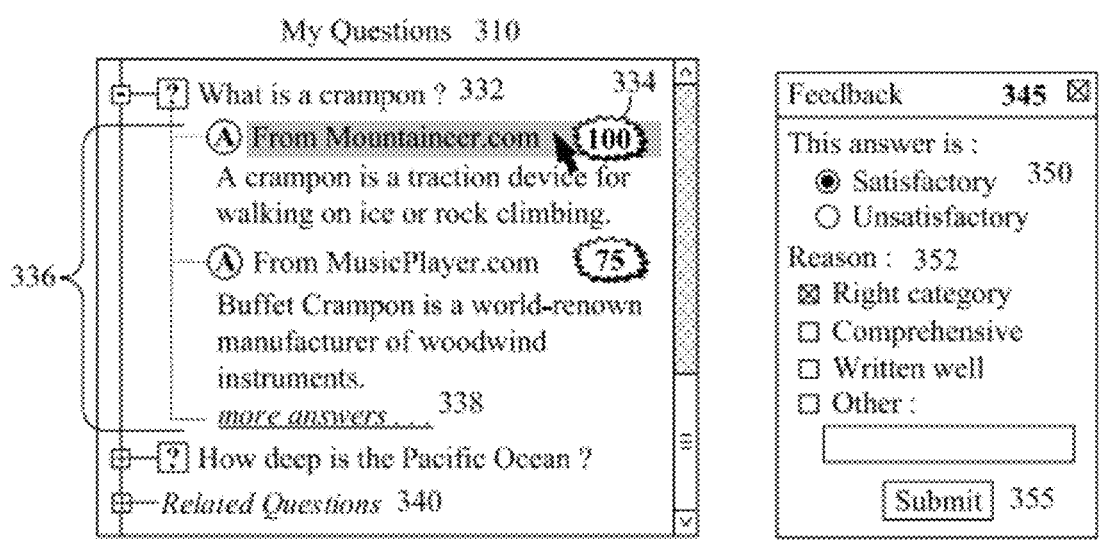
FIG. 3A is an example of the My Questions component and feedback window of the social media Q&A manager user interface.

The My Questions component 310 can be used to present the questions entered by the user as well as the answers aggregated by the social media Q&A manager. Collection 330 of FIG. 3A can illustrate a detailed example of the My Questions component 310.

The user-entered questions 332 and aggregated answers 336 can be presented in a tree structure that can be collapsed/expanded. As shown in this example, the question 332, "What is a crampon?" has been expanded to display the aggregate of answers 336. The answer quality 334 of each answer can also be visually presented.

Further, the aggregate of answers 336 can include a mechanism by which a user can elect to view more 338 of the answers contained in the aggregate. For example, the social media Q&A manager can be configured to present a specific quantity of answers 336 or answers 336 above a predefined answer quality 334 threshold. Should the user feel that the presented answers 336 are insufficient, the user can select the view more 338 option to examine the rest of the answers 336.

The My Questions component 310 can further include a mechanism 340 to present answers 336 to questions 332 determined to be related to the user's questions. Thus, in this example, the related questions 340 element can include questions 332 and their corresponding answers 336 that are related to ocean depths and/or mountaineering.

Selection of an answer 336 by the user can result in the display of a feedback window 345. The feedback window 345 can request data from the user regarding their opinion of how well the answer 336 resolved their question 332. The specific data requested within the feedback window 345 can vary and can be inclusive of the feedback data used by the social media data source that provided the answer 336.

In this example, the feedback window 345 can ask the user to rate the answer 336 as either satisfactory or unsatisfactory 350 as well as provide one or more reasons 352 for their rating 350. The reasons 352 presented to the user can depend upon the selected rating 350 and/or social media data source.

Once the user is finished entering data into the feedback window 345, the user can select the Submit button 355. Doing so can close the feedback window 345 and trigger the social media Q&A manager to propagate the feedback data to the corresponding social media data source.

The Ask a Question component 315 can present the user with the data collection elements necessary for requesting an aggregate of answers, such as those shown in the Ask a Question component 315 of FIG. 3B. In this example, the Ask a Question component 315 can include a question area 360, a data sources area 365, and a submit button 375.

The submit button 375 can indicate that the user has finished entry in the Ask a Question component 315 and the entered data can be used by the social media Q&A manager. The question area 360 can be configured to accept entry of the user's question like a text box.

The data sources area 365 can allow the user to specify the social media data sources that should be queried with the entered question. The data sources area 365 can include an option for the social media Q&A manager to determine and utilize those social media data sources that it deems applicable 370 to the user's question. The applicable data sources option 370 can be of particular benefit since the social media Q&A manager can be aware of more social media data sources than the user.

The Answer a Question component 320 of the social media Q&A manager user interface 305 can redirect the user to a questionnaire for determining what topics or experiences that the user has knowledge. Alternately, the Answer a Question component 320 can present the user with questions in the question library that have not yet been answered by any of the social media data sources.

Figure 4:
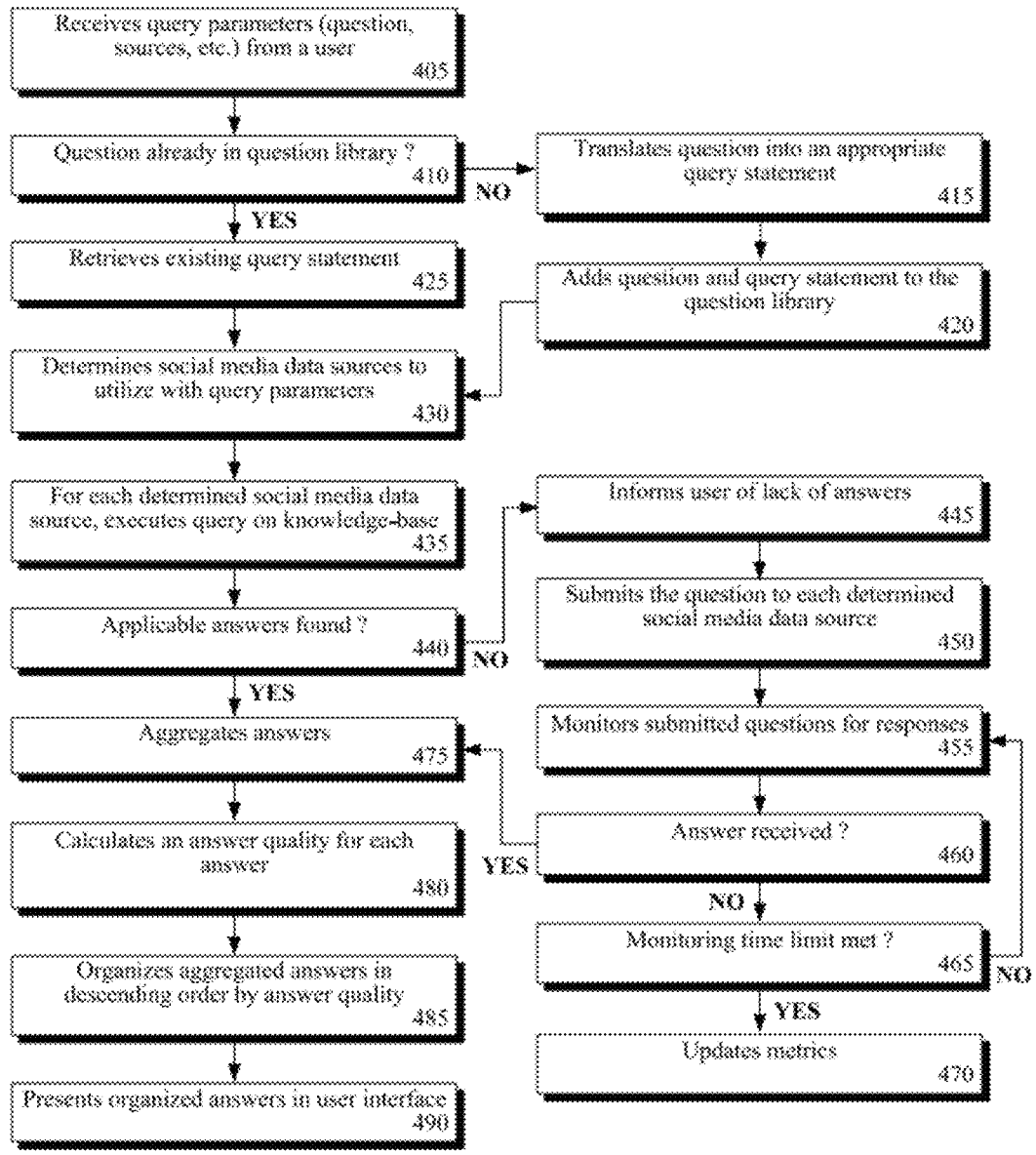
FIG. 4 is a flow chart of a method detailing the operation of the social media Q&A manager in accordance with embodiments of the inventive arrangements disclosed herein.

FIG. 4 is a flow chart of a method 400 detailing the operation of the social media Q&A manager in accordance with embodiments of the inventive arrangements disclosed herein. Method 400 can be perform actions described in interaction diagram 100 and/or can be performed within the context of system 200, and/or in conjunction with the social media Q&A manager user interface 305 of FIG. 3.

Method 400 can begin in step 405 where the social media Q&A manager can receive query parameters (i.e., question and data sources) via the user interface. In step 410, it can be determined if the question is already contained in the question library.

When the question is not already in the question library, step 415 can execute where the question can be translated into an appropriate query statement. The question and the query statement can then be added to the question library in step 420.

When the question is already in the question library, step 425 can execute where the existing query statement for the question can be retrieved from the question library. Upon completion of step 420 or step 425, the social media data sources to be used with the query parameters can be determined in step 430.

In step 435, the query statement can be executed on the knowledge-base of each determined social media data source. It can be determined, in step 440, if any applicable answers were found.

When applicable answers were not found, step 445 can execute where the user can be informed of the lack of answers. The user's question can then be submitted to each determined social media data source in step 450.

In step 455, the submitted questions can be monitored, over a predetermined time period, for responses. Step 455 can be performed utilizing a listening agent on each social media data source or by periodically polling the social media data sources.

In step 460, it can be determined if an answer has been received for a submitted question. When an answer has yet to be received, it can be determined if the monitoring time limit has been met in step 465. When the monitoring time limit has not been met, flow can return to step 455. When the monitoring time limit has been met, step 470 can execute where the appropriate metrics can be updated.

When an answer has been received or when it was determined that an applicable answer was found in step 440, step 475 can execute where the answers can be aggregated. The answer quality for each answer can then be calculated in step 480.

In step 485, the aggregate of answers can be organized in descending order by the calculated answer quality. The organized answers can then be presented to the user in the user interface in step 490.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed:

1. A system for managing user-generated questions and answers across multiple social media sources comprising:
   a processor;
   a non-transitory memory;
   computer program code stored within the non-transitory memory and able to be executed by the processor;
   a plurality of social media data sources, stored in data of the non-transitory memory, configured to maintain data representing a collection of knowledge from its respective members;
   a social media question and answer (Q&A) manager, comprising at least a portion of the computer program code, configured to organize and present knowledge from the plurality of social media data sources for a user-entered question, wherein said social media Q&A manager operates independent of the plurality of social media data sources; and
   an answer quality calculator, comprising at least a portion of the computer program code, configured determine an answer quality for each element of knowledge, wherein said answer quality quantitatively represents a completeness and reliability of the knowledge with respect to the user-entered question, wherein the answer quality is based upon a plurality of quality factors, wherein said plurality of quality factors comprise an identifier of an author of the knowledge, a competency level of the author of the knowledge, an amount of time in which the author provided the knowledge, an identifier of the social media data source containing the knowledge, a position of the knowledge within a data structure of the social media data source, a feedback rating assigned to the knowledge by visitors of the social media data source, and references associated with the knowledge.

2. The system of claim 1, wherein the social media Q&A manager further comprises:
   a user interface, produced responsive to the processor executing of at least a portion of the computer program code, configured to accept user-entered data, such as the user-entered question, and present said knowledge, wherein the user-entered data is selectively distributed to at least one of the plurality of social media data sources.

3. The system of claim 1, wherein the social media Q&A manager further comprises:
   a question handler, comprising at least a portion of the computer program code, configured to perform a plurality of functions utilizing the user-entered question, wherein said plurality of functions comprises at least translating a text of the user-entered question into a query statement usable by the plurality of social media data sources, recording the text of the user-entered question and the query statement in a question library, executing the query statement on at least one of the plurality of social media data sources, determining at least one social media data source as related to the user-entered question, posting the user-entered question to at least one social media data source, and monitoring posted questions for responses.

4. The system of claim 1, further comprising:
   a communications handler, comprising at least a portion of the computer program code, configured to establish communications sessions between the social media Q&A manager and the plurality of social media data sources, wherein said communications sessions are established using at least one of a set of authorization credentials associated with a user of the social media Q&A manager, a set of authorization credentials associated with an entity providing use of the social media Q&A manager, and a set of guest authorization credentials, wherein said set of guest authorization credentials at least allows an ability to search the knowledge of the at least one applicable social media data source and submit the user-entered question.

5. The system of claim 1, wherein a social media data source comprises at least one of a social networking site, a communal discussion site, a communal gaming site, a microblog, a virtual world, a communal streaming site, a data-sharing site, a WIKI site, and a massive multi-player online (MMO) gaming site.

6. The system of claim 1, wherein the social media Q&A manager is provided as a licensed service of at least one of the plurality of social media data sources, wherein the social media Q&A manager is accessible from within a user interface of the at least one social media data source, yet owned and operated by an entity independent of the plurality of social media data sources.

7. A computer program product comprising a non-transitory computer readable storage medium having computer usable program code embodied therewith, the computer usable program code comprising:
   computer usable program code, stored in the non-transitory computer readable storage medium, configured to receive a plurality of query parameters via a user interface, wherein said plurality of query parameters comprise at least a user-entered question;
   computer usable program code, stored in the non-transitory computer readable storage medium, configured to query a plurality of social media data sources for knowledge related to the user-entered question, wherein a social media data source maintains a plurality of data representing a collection of knowledge from its members, wherein said knowledge represents at least one of a textual phrase, a textual sentence, a textual paragraph, a hyperlink, a list, an audio file, a video file, and an image;
   computer usable program code, stored in the non-transitory computer readable storage medium, configured to, when knowledge related to the user-entered question exists in at least one social media data source, organize and present the existing related knowledge in the user interface, wherein the existing knowledge is organized in accordance with a determined answer quality;
   computer usable program code, stored in the non-transitory computer readable storage medium, configured to, when knowledge related to the user-entered question is at least one of non-existent in at least one social media data source and deemed unsatisfactory by a user, automatically submit the user-entered question to at least one applicable social media data source, wherein said submission is performed on behalf of the user;
   computer usable program code, stored in the non-transitory computer readable storage medium, configured to monitor a status of the user-entered question submitted to the at least one applicable social media data source, wherein said status comprises at least an unanswered status, an answered status, and a new answer status;
   computer usable program code, stored in the non-transitory computer readable storage medium, configured to, when the status of the submitted user-entered question changes to at least one of the answered status and the new answer status, re-execute the querying of the plurality of social media data sources;
   computer usable program code, stored in the non-transitory computer readable storage medium, configured to analyze a taxonomy for a social media data source; and
   computer usable program code, stored in the non-transitory computer readable storage medium, configured to identify equivalencies between taxonomies, wherein said equivalencies are based upon at least synonymous terminology, taxonomical hierarchy, and semantics.

8. The computer program product of claim 7, further comprising:
   computer usable program code, stored in the non-transitory computer readable storage medium, configured to identify at least one of the plurality of social media data sources as applicable to the user-entered question; and
   computer usable program code, stored in the non-transitory computer readable storage medium, configured to establish a communications session with the at least one applicable social media data source, wherein said communications session is established using at least one of a set of authorization credentials associated with the user, a set of authorization credentials associated with an entity providing use of the social media Q&A manager, and a set of guest authorization credentials, wherein said set of guest authorization credentials at least allows an ability to search the knowledge of the at least one applicable social media data source and submit the user-entered question.

9. The computer program product of claim 7, wherein, when the status of the submitted user-entered question changes to the new answer status, said method further comprises:
   computer usable program code, stored in the non-transitory computer readable storage medium, configured to propagate the response to the user-entered question to other applicable social media data sources, wherein said response is associated with an existing question that is at least one of identical and similar to the submitted user-entered question.

10. The computer program product of claim 7, wherein organizing the existing knowledge further comprises:
    computer usable program code, stored in the non-transitory computer readable storage medium, configured to assess the answer quality of the existing knowledge based upon a plurality of quality factors, wherein said plurality of quality factors comprise a combination of at least three of an identifier of an author of the knowledge, a competency level of the author of the knowledge, an amount of time in which the author provided the knowledge, an identifier of the social media data source containing the knowledge, a position of the knowledge within a data structure of the social media data source, a feedback rating assigned to the knowledge by visitors of the social media data source, and references associated with the knowledge; and
    computer usable program code, stored in the non-transitory computer readable storage medium, configured to order a list of the existing knowledge by the answer quality.

11. The computer program product of claim 7, further comprising:
    computer usable program code, stored in the non-transitory computer readable storage medium, configured to solicit feedback data from the user for the organized knowledge, wherein said feedback data qualitatively expresses a degree to which an element of existing knowledge satisfies the user-entered question; and
    computer usable program code, stored in the non-transitory computer readable storage medium, configured to propagate the feedback data to the social media data source associated with the element of existing knowledge.

* * * * *